July 22, 1952     W. C. HODGSON     2,603,886
MOTION CONTROLLING APPARATUS FOR FUSE CONTROL TRAINING
Filed Feb. 8, 1946     3 Sheets-Sheet 1

INVENTOR.
WILLIAM C. HODGSON
BY
*M. O. Hayes*
ATTORNEY

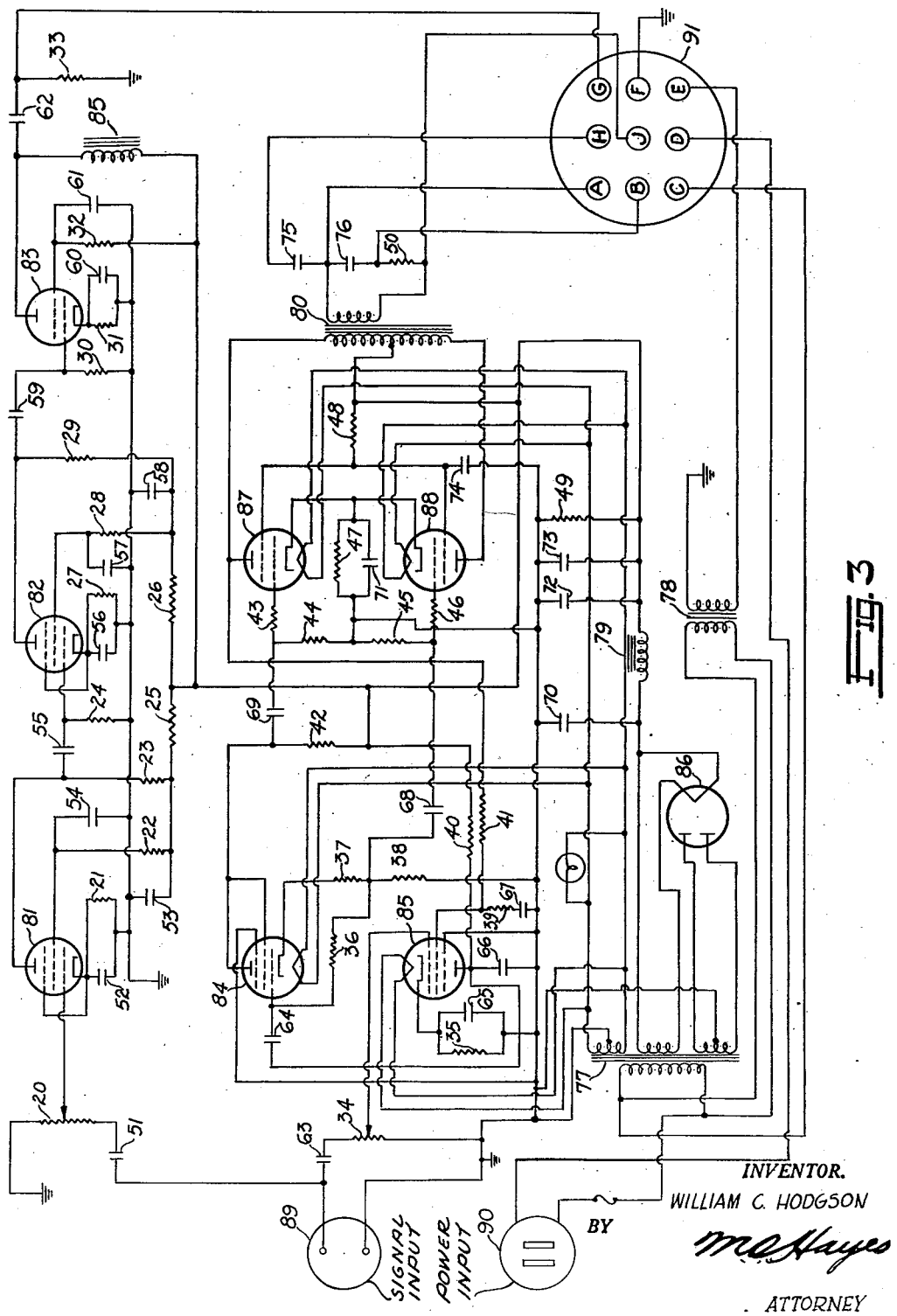

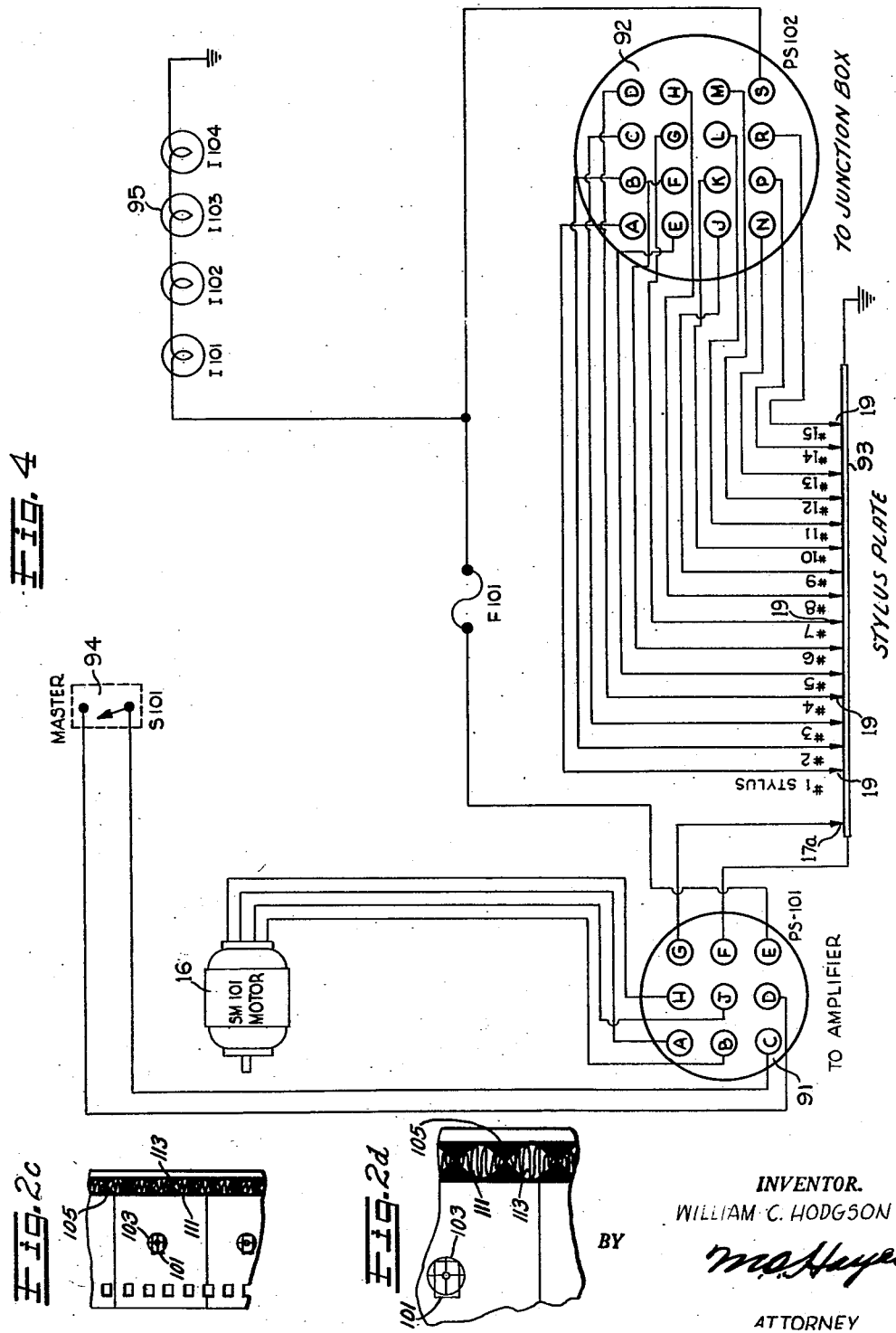

Patented July 22, 1952

2,603,886

UNITED STATES PATENT OFFICE 2,603,886

MOTION CONTROLLING APPARATUS FOR FUSE CONTROL TRAINING

William C. Hodgson, United States Navy

Application February 8, 1946, Serial No. 646,476

10 Claims. (Cl. 35—25)

(Granted under the act of March 3, 1883, as amended April 30, 1928; 370 O. G. 757)

This invention relates in general to the transformation of recorded impressions into progressive motion and to a process and apparatus therefor, and in particular to the transformation of a recorded variable wave motion into a correspondingly variable progressive motion and to the utilization thereof.

For various military training purposes it has been found desirable to coordinate a recorded motion, such as, the motion recorded on a moving picture film, with a timed student response to a sequence of pictures photographed on the film. For example, a highly desirable method for training military students in techniques of marksmanship from a moving aircraft contemplates presenting to the student a motion picture taken from moving aircraft, and training and testing his response to such picture. In order to carry out this training and testing in an efficient manner it is desirable to have a marking or grading method which indicates the proportional error in student response. Inasmuch as the student error depends not only on the time interval between the correction reaction point and the actual reaction point but also on the speed of the aircraft either on an absolute basis or on the basis of rate of closure of the aircraft with respect to another moving object, it is insufficient merely to note the student's error in terms of time interval; on the contrary it is highly desirable to provide a means for measuring the student error in terms of linear distance. For this purpose, it is useful to provide a means correlated with the airplane speed for translating time intervals into linear distances.

Accordingly, it is an object of this invention to provide a means for correlating time intervals with linear distances at varying velocities.

Another object is to provide a process for translating a varying recorded impression into correspondingly varying progressive motion.

Another object is to provide a process and apparatus for translating a recorded variable wave motion into a correspondingly variable progressive motion.

Another object is to provide a method and apparatus for determining the accuracy of student response to a predetermined combination of distance and speed.

Another object is to provide a method and apparatus using conventional electrical equipment for determining the accuracy of students in military bombing operations.

Further objects and advantages of this invention, as well as its construction, arrangement and operation will be apparent from the following description and claims in connection with the accompanying drawings, in which Fig. 1 is a block diagram illustrating the arrangement of the electrical equipment according to one form of the invention.

Figs. 2a, 2b and 2c are fragmentary views illustrating parts of a motion-picture film according to the invention.

Fig. 2d is an enlarged view of the film portion illustrated in Fig. 2c.

Fig. 3 is a wiring diagram showing the arrangement of an amplifying system according to one form of this invention.

Fig. 4 is a schematic wiring diagram showing the correlation of electrical equipment for marking a recording tape according to one form of the invention.

According to this invention a recorded frequency or periodic physical characteristic, such as a wave of varying frequency on motion-picture film, is translated into an electrical frequency, amplified, and thereafter utilized to operate a responder such as a synchronous type electric motor at a controlled, variable speed that is dependent on the recorded frequency.

According to another embodiment of this invention, a recorded frequency is utilized to drive a synchronous-type electric motor as hereinbefore described, and a different recorded frequency superimposed thereon is utilized to control another related mechanical motion.

Figure 1:
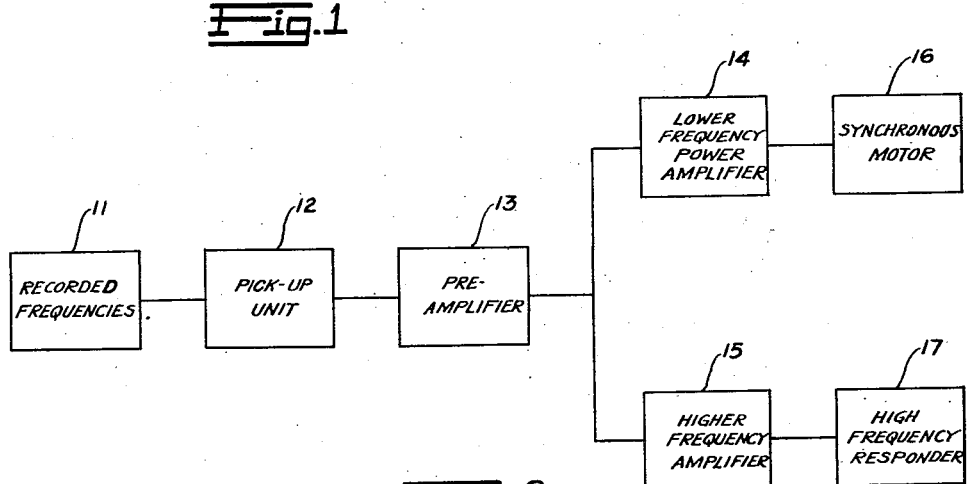

Fig. 1 shows in outline a simple arrangement whereby two superimposed frequencies are translated into electrical frequencies and are utilized to control mechanical response, at least one of the frequencies being utilized to control a progressive mechanical motion.

As shown in Fig. 1, a recorded mechanical frequency 11, for example a strip of moving picture film having thereon a conventional recorded wave with a basic frequency of about 20 to 180 cycles per second, is used as the source of a sinusoidal wave motion. Superimposed upon the basic frequency is a higher recorded frequency, for example about 2000 cycles per second. The recorded frequency, of course, may be a recording in other form of wave characteristics, such as a physical impression in a wax surface or the like, or a magnetized impression in a metallic wire, tape or the like.

The recorded frequency 11 is passed to a pickup unit 12 which is appropriate to the nature of the recording. For example, where the recording is a conventional wave formation photographed on a strip of photographic film, the pickup unit 12 will comprise a light shining through the film onto a photoelectric cell whereby the recorded frequency is translated into an electrical frequency. Where the recorded frequency is a physical impression in a surface, the pickup unit 12 may be a needle or the like adapted to follow the frequency impressed on the surface. Other forms of pickup unit will be appropriately designed to operate with respective forms of recorded frequencies.

The electrical frequency from the pickup unit is passed to a conventional amplifier 13 which serves simply to amplify the electrical frequency to a workable size so that the subsequent operations on the electrical frequency may be carried out on a convenient scale. For this purpose the choice of amplifier arrangement and wiring diagram is not critical and numerous conventional types of amplifiers may be used. The particular type of amplifier will in general be a matter of personal choice, and an appropriate selection of type will be obvious to those skilled in the art. Often it will be most convenient to use the amplification system of a conventional sound-motion-picture projector with which the accompanying strip of exposed motion picture film can be projected onto a screen.

The output of the amplifier is directed to two further pieces of electrical equipment, namely an amplifier 14 for low-frequency vibrations and an amplifier or relay 15 for high-frequency vibrations. According to one form of the invention the high frequency amplifier 15 may be an electronic-type relay adapted to be energized by a high-frequency impulse which, for example, might be produced by the pickup and amplification of a high frequency recorded on a motion-picture film or the like.

This electronic relay in one form of the invention is a selective amplifier that discriminates against the lower or higher base frequencies which have been recorded and amplified, and responds to a narrow range of frequency, for example, the higher frequency superimposed on the recording. A wiring diagram of this amplifier or relay 15 is included in Fig. 3 and will be described in detail in connection therewith.

The lower-frequency power amplifier 14 serves to amplify the lower frequencies to a stage where they are sufficiently powerful to operate or control electrically responsive equipment such as an electric motor. A conventional amplifier can here be used; however, in one form of the invention the amplifier can be interconnected with the higher-frequency amplifier 15, and a wiring diagram for such an amplifier is set forth in detail in Fig. 3.

As indicated in Fig. 1, the lower-frequency power amplifier feeds a synchronous-type motor 16, which is thereby operated to produce a progressive motion having a variable rate depending upon the basic recorded frequency. In a specific form of the invention there is used a conventional synchronous motor which is designed to rotate at 75 R. P. M. when driven by 60 cycle alternating current. This motor rotates at a slower rate when the input frequency is reduced and at a higher rate when the input frequency is increased, the rate of rotation being exactly proportional to the input frequency rate. The motor is responsive to frequency changes at least in the range of 20 cycles per second to 120 cycles per second and is completely non-responsive to a frequency rate in a higher range such as the 2000 cycle per second rate that is superimposed on the basic frequency in this one form of the invention. Numerous commercially produced motors fulfill these requirements; one specific motor that has been found highly satisfactory is sold by General Electric Company, catalog No. SMY50H18.

There is also a high-frequency responder 17 which is adapted to respond to the signal from the high-frequency amplifier 15. The type of response of this responder 17 will be determined by the individual requirements for each case; however, in general this responder 17 will be adapted to produce either electrical or mechanical response to the signal from amplifier 15.

Figure 2:
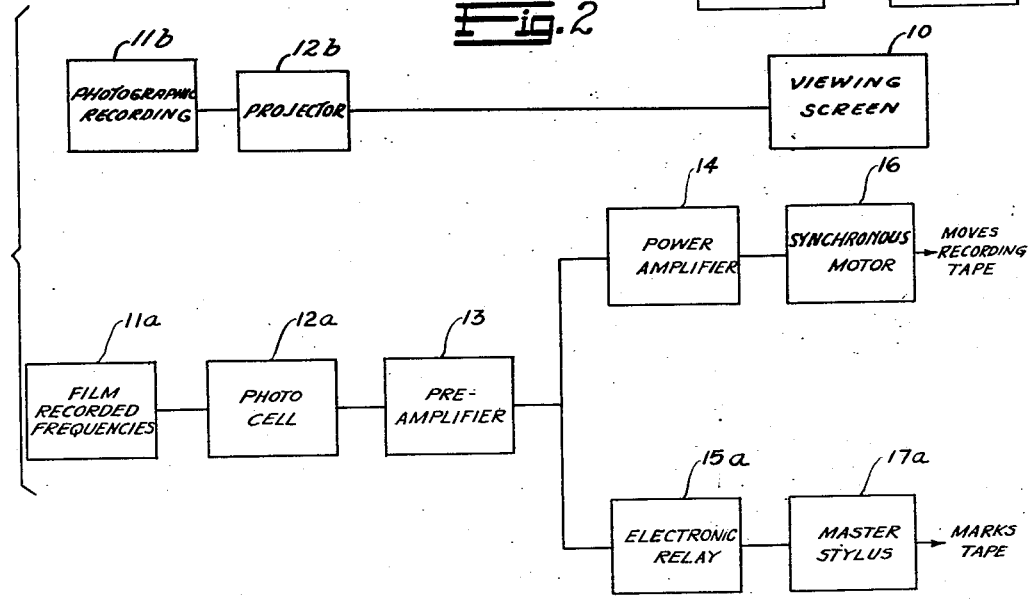
Fig. 2 is a block diagram illustrating the arrangement of equipment according to another form of the invention.
Figure 2A:
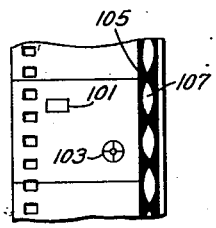
Figure 2B:
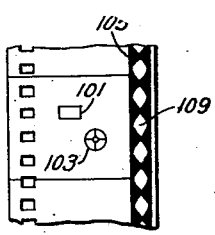

In Figure 2 there is outlined a system whereby a film recording is utilized to operate a recording tape at a variable speed while individual student reactions are recorded on the tape in comparison with a master marking on the same tape. According to this arrangement a moving-picture film can be exposed from an airplane which is engaged in an operation suitable for a bombing approach to a target area. The developed film, as illustrated in Figs. 2a–2d, contains a motion-picture record of a target 101 and reticle 103 of the air-borne target-sighting apparatus (not shown). Along one edge of the film is the sound-track area 105, where there is recorded, as at 107, the basic frequency that varies in proportion to the plane's speed or the plane's closure rate with respect to a moving target during the film exposure. As noted above, a recorded frequency of 60 cycles per second produces a motor speed of 75 R. P. M. and such a speed corresponds, in the present illustration, to an aircraft-to-target closure speed of a preselected magnitude, say 300 knots. Other frequency values, as noted, produce corresponding motor speeds and such other motor speeds, in turn, correspond to respective aircraft-to-target closure rates. In an operative embodiment, the following relationships between film-recorded frequency and closure speed were employed.

| Frequency | Closure Speed |
|---|---|
| Cycles/sec. | Knots |
| 20 | 100 |
| 30 | 150 |
| 40 | 200 |
| 50 | 250 |
| 60 | 300 |
| 70 | 350 |
| 80 | 400 |
| 90 | 450 |
| 100 | 500 |
| 110 | 550 |
| 120 | 600 |

For recording the frequencies on the film adjacent the photographic representation of the bombing approach, any suitable method and arrangement commonly employed in the art of sound-motion-picture recording can be used. Inasmuch as the specific recording technique employed for this purpose, in and of itself, is not thought to be novel, a fuller description thereof is deemed here to be unnecessary.

The variation in frequency of the basic frequency is shown in Figs. 2a–2d as a variation in area of markings. Thus, the markings 109 and 111 (Figs. 2b and 2c) are of respectively lesser area than that of marking 107, corresponding to relatively increased closure rates. Superimposed on this basic frequency is a higher frequency 113, which is adapted to operate a master marking stylus as will be hereinafter described. The two superimposed frequencies are represented in Fig. 2 by block 11a entitled "film recorded frequencies."

These frequencies 11a are transformed into electrical impulses in a pickup unit 12a which comprises, for example, a light shining through the sound track onto a photo cell, and the electrical impulses generated thereby are given preliminary amplification in an amplifier 13.

The basic or low frequency is additionally amplified in power amplifier 14 and utilized to operate a synchronous motor 16 at a variable rate as described in connection with Fig. 1, thereby moving a recording tape at a variable rate according to the basic recorded frequency on the film 11a.

The high frequency derived from film 11a is fed to an electronic relay 15a, the outline of which will be set forth hereinafter, and operates a master stylus 17a, which places an identifying mark on the moving tape.

At some time during the operating period each of a number of students, viewing on viewing screen 10 a projection by projector 12b of the moving picture on photographic recording 11b, operates an individual firing control 18 which in turn activates an individual stylus 19 to mark the recording tape. Thus the tape moves through a recording apparatus (not shown in the figure) at a predetermined rate according to the basic film recorded frequency, the master tape datum marking is applied by the master stylus 17a to coincide with a correct reaction time, such as the correct time for bomb release, and an individual marking on the tape by each student indicates the individual student response, which in comparison with the master marking indicates error in terms of linear distance along the marking tape. (The proper release instant for a bomb and the "commence-fire" instant for aircraft guns against a target are each a function of range, bearing and speed. A bomb dropped from too great a range will undershoot the target. Similarly, the effective ranges of aircraft guns are constants well-known to the gunner. It is essential, therefore, that the bombardier or gunner be able to estimate target range accurately. One application of the subject invention is the training of bombardiers and gunners to estimate range accurately. In such application, the master stylus 17a is energized at the instant the target, as depicted on the motion-picture film, is at correct firing range. If the maximum effective range of a 20 mm. cannon is 3000 yards, the gunner should commence firing at this range. The area of the reticle 103 (Fig. 2d) filled by the target 101 is used by the gunner-trainee as a reference to estimate range. A target with a certain wing-spread, seen head-on, will fill a certain portion of the reticle when such target is at a range of 3000 yards. In such an application the film sound track will be prepared so as to include the high-frequency signal 113 at the instant the correct commence-fire range is reached. This signal will trigger the master stylus 17a, thus marking the chart at the proper time. This "master" mark can be used as a reference in scoring range estimations made and recorded by a gunner-trainee.)

In Fig. 3 there is shown a wiring diagram for an amplifier and relay system which is suitable for use in the embodiments of the invention shown in Figs. 1 and 2. Fig. 3 shows what appears to be a unitary piece of electrical equipment but which serves the purpose of the lower-frequency amplifier 14 and the higher-frequency amplifier or electronic relay 15 or 15a, the upper portion of the figure being amplifier 15 and the lower portion being amplifier 14. The preamplifier 13 according to this diagram may be a conventional system such as is commonly used in a sound-motion-picture projector.

Conventional electrical symbols are used throughout the wiring diagram: Specifically, reference numerals 20 through 50 refer to resistors, 51 through 76 to condensers, 77 and 78 to transformers, 79 to a filter choke, 80 to an output transformer, and 81 to 88 to vacuum tubes. The electrical system can be connected to a conventional 110 volt, 60 cycle circuit through socket 90, and the output from the amplifier 13 of Fig. 1 or Fig. 2 (for example, the amplifier in a conventional sound moving picture projector) is fed into the system through socket 89. The output of the electrical system goes to a multi-pole plug 91, from which it is fed to motor 16 and to other electrical equipment as indicated in Figs. 1, 2 and 4.

It will be understood that the values of the components indicated may be varied according to the effect or result that it is desired to attain and it is believed that these variations are within the ability of those skilled in the art. However, a typical combination of electrical values is set forth in Table 1 in which the first column lists the reference number of the component in Fig. 3, the second column lists the nature of the component and the third column lists its numerical electrical value.

*Table 1*

| | | |
|---|---|---|
| 20 | Resistor | 3 Megohms. |
| 21 | do | 2000 Ohms. |
| 22 | do | 3 Megohms. |
| 23 | do | 100,000 Ohms. |
| 24 | do | 500,000 Ohms. |
| 25 | do | 35,000 Ohms. |
| 26 | do | 35,000 Ohms. |
| 27 | do | 2,000 Ohms. |
| 28 | do | 3 Megohms. |
| 29 | do | 250,000 Ohms. |
| 30 | do | 250,000 Ohms. |
| 31 | do | 250 Ohms. |
| 32 | do | 50,000 Ohms. |
| 33 | do | 100,000 Ohms. |
| 34 | do | 3 Megohms. |
| 35 | do | 2,000 Ohms. |
| 36 | do | 1 Megohm. |
| 37 | do | 5,000 Ohms. |
| 38 | do | 100,000 Ohms. |
| 39 | do | 30,000 Ohms. |
| 40 | do | 250,000 Ohms. |
| 41 | do | 1,500,000 Ohms. |
| 42 | do | 100,000 Ohms. |
| 43 | do | 10,000 Ohms. |
| 44 | do | 250,000 Ohms. |
| 45 | do | 250,000 Ohms. |
| 46 | do | 10,000 Ohms. |
| 47 | do | 250 Ohms. |
| 48 | do | 5,000 Ohms. |
| 49 | do | 25,000 Ohms. |
| 50 | do | 400 Ohms. |
| 51 | Condenser | .0001 Mfd. |
| 52 | do | .25 Mfd. |
| 53 | do | 8. Mfd. |
| 54 | do | .5 Mfd. |
| 55 | do | .0001 Mfd. |
| 56 | do | .25 Mfd. |
| 57 | do | .5 Mfd. |
| 58 | do | 8. Mfd. |
| 59 | do | .0001 Mfd. |
| 60 | do | 25. Mfd. |
| 61 | do | .5 Mfd. |
| 62 | do | .25 Mfd. |
| 63 | do | .25 Mfd. |
| 64 | do | .25 Mfd. |
| 65 | do | 25. Mfd. |
| 66 | do | .0001 Mfd. |
| 67 | do | .5 Mfd. |
| 68 | do | .5 Mfd. |
| 69 | do | .5 Mfd. |
| 70 | do | 8. Mfd. |
| 71 | do | 25. Mfd. |
| 72 | do | 8. Mfd. |
| 73 | do | 8. Mfd. |
| 74 | do | 8. Mfd. |
| 75 | do | 8. Mfd. |
| 76 | do | 4. Mfd. |
| 77 | Transformer | |
| 78 | do | |
| 79 | Filter Choke | |
| 80 | Output Transformer | |
| 81 | Vacuum Tube | 6SJ7. |
| 82 | do | 6SJ7. |
| 83 | do | 6L6. |
| 84 | do | 6SJ7. |
| 85 | do | 6SJ7. |
| 86 | do | 5U4G. |
| 87 | do | 6L6. |
| 88 | do | 6L6. |

In order to obtain maximum efficiency of operation it is necessary to have a proper electrical balance between the transformer 80, condensers 75 and 76, resistor 50 and synchronous motor 16 (refer to Figs. 3 and 4). A satisfactory balance has been obtained by using condensers and resistances as indicated in Table 1, where transformer 50 may be a conventional transformer such as a transformer manufactured by the Stancor Company, Serial No. Stancor A-3801, and the motor 16 is as previously described.

In Fig. 4 there is shown a schematic diagram indicating a wiring setup under which the output of the amplifier system shown in Fig. 3 is caused to cooperate with other electrical equipment to present an electrical circuit and apparatus as shown in Fig. 2. In this diagram, the low-frequency output from the equipment shown in Fig. 3 is fed via multi-pole plug 91 to motor 16. Interconnections between the apparatus of Fig. 3 and Fig. 4 are indicated by corresponding connections to plug 91. The motor serves to draw a tape through a conventional recording apparatus at a rate dependent on the recorded frequency as previously described. The tape is a conventional electrical marking tape which is adapted to transmit electric current and to leave a mark at the point where current has passed. Accordingly, the tape can be marked by passing it between a contact point or stylus and a contact or ground plate and at the proper time causing current to flow between the stylus and the plate.

The tape (not shown) is drawn between a stylus plate 93 and a series of styli, for example (as shown in Fig. 4), fifteen individual styli 19 and a master stylus 17a (refer to Fig. 2). The master stylus 17a is adapted to be energized by the output of electronic relay 15a according to Fig. 2 as obtained from multi-pole plug 91 in Figs. 3 and 4. The individual styli 19 are adapted to be individually energized by fifteen contact buttons or the like (not shown) which feed into multi-pole plug 92 to which the styli are electrically connected.

Also shown in Fig. 4 are a group of conventional lamps 95 which serve to illuminate certain portions of the equipment in a conventional manner, as well as conventional fuses, and a master switch 94 which controls operating current of the entire electrical assembly.

The equipment shown in Figs. 3 and 4 is adapted to fit into the block diagram shown in Fig. 2, with Fig. 3 showing the amplification system according to Fig. 2 and with Fig. 4 showing the operational features such as motor 16, master stylus 17a and the individual styli 19.

Numerous variations and modifications can be made in the construction and arrangement of this invention as well as numerous extensions of the application thereof, and such variations and extensions will be within the scope of the invention as disclosed and claimed herein. For example, the application has specifically shown the use of this invention for student training, but it will be understood that the invention has a much broader scope covering numerous different occasions wherein it will be desired to coordinate a varying mechanical motion with a predetermined mechanical or electrical response. The particular use of the invention will be apparent to one skilled in the art who will be able to adjust the specific features to accommodate his own specific needs.

As a further modification of this invention, it is understood that for numerous industrial purposes it may be desirable to control a mechanical motion, such as a recording or control device, by non-recorded means such as the passage of a series of moving objects past a photo-electric cell. The equipment disclosed herein can be adapted to operate from the interrupted current provided by a photo-electric cell in such an arrangement.

The invention described herein may be manufactured and used by or for the Government of the United States of America for governmental purposes without the payment of any royalties thereon or therefor.

I claim:

1. Apparatus for testing the correctness of response of a subject to a circumstance, said apparatus comprising a reproducible recording adapted, upon reproduction, to simulate said circumstance, means on said recording defining a plurality of superimposed periodic impressions related to said circumstance, means for reproducing said recording to simulate said circumstance and to affect said subject, means transforming said periodic impressions into respective individual electrical signals, recording means, means responsive to one of said signals to condition said recording means to record a subject response, and means responsive to another of said signals to record on said recording means a datum wherewith to compare said response.

2. A student-training apparatus for ascertaining the correctness of a student's response to circumstances, comprising a projectable motion-picture film having pictures thereon depicting said circumstances, means on said film defining a varying periodic impression related to a correspondingly varying condition depicted on said film, means for projecting said film within the view of a student, means for transforming said varying periodic impression into a frequency-variable electrical signal, recording means, means responsive to said signal to control the progressive movement of said recording means in accordance with the variations in frequency of said signal, and means for recording on said recording means the student's reaction to said circumstances.

3. A student-training apparatus for determining the correctness of a student's response to circumstances, comprising a projectable motion-picture film having means thereon for depicting said circumstances, and for defining a plurality of superposed periodic impressions of different frequency ranges related to occurrences depicted on said film, means for projecting said film within the view of a student and transforming said varying periodic impressions into electrical impulses, means separating said electrical impulses into individual signals corresponding to respective ones of such periodic impressions, recording means, means responsive to one of said signals to control the movement of said recording means, and employing another of said signals for providing a basis of comparison for a student reaction.

4. A student-training apparatus comprising means for projecting a motion-picture film of an aircraft moving toward a target at a variable velocity, means on said motion-picture film adjacent to the pictures thereon defining a frequency-varying periodic impression the instant frequency of which is proportional to the instant closure rate of said aircraft with respect to said target, means transforming said periodic impression into an electrical signal having frequency variations corresponding to the frequency variation of said impression, a recording tape, a synchronous motor responsive to said electrical signal for moving said tape at a speed varying in accordance with said closure rate, and means for recording a student reaction to said pictures by marking means positioned adjacent to the path of said tape and adapted to mark said tape.

5. Student-training apparatus comprising means embodying a periodic physical characteristic having a basic frequency range and having superimposed thereon a frequency of a different range, a pickup unit for transforming said physical characteristic into a periodic electric impulse, a preamplifier to increase the magnitude of said electric impulse, a basic frequency amplifier to further increase the magnitude of said basic electric impulse, a synchronous-type electric motor operated by the output of said basic frequency amplifier to move a recording tape past a fixed point whereby said recording tape is moved at a rate proportional to said basic frequency, a second amplifier tuned to the superimposed frequency and operating a responder to mark said tape at a time corresponding to the timed position of said superimposed frequency with relation to said basic frequency, and individually operated means for marking said tape at a point having a predetermined relation to the point on said tape marked by said responder whereby the time of marking of the tape by a student can be related to the time of marking of said tape by said responder.

6. A student-training means comprising means having recorded thereon in superimposed relation a plurality of periodic variations of different frequency ranges, means for converting said variations into electrical impulses, means for segregating said electrical impulses into individual signals corresponding respectively to individual ones of said ranges, recording means adapted to record an act of a student, means for employing one of said signals to control the operation of said recording means, and means for employing another of said signals to furnish a datum on said recording means for evaluating said act.

7. Student-training apparatus comprising a motion-picture film having a photographic representation of an event recorded thereon, said film also having a sound track characterized by a plurality of periodic variations of different frequency ranges, means for converting the periodic variations of the sound track of said film into electrical impulses, means for segregating said electrical impulses into individual signals corresponding to respective frequency ranges of said periodic variations, recording means, means for employing one of said signals to control the movement of said recording means, and means for employing another of said signals to cause a datum point to be recorded on said recording means.

8. Student-training apparatus comprising means embodying a periodic physical characteristic having a basic frequency range and having superimposed thereon a frequency of a different range, a pickup unit to transform said physical characteristic into a periodic electric impulse, a preamplifier to increase the magnitude of said electric impulse, a basic frequency amplifier to further increase the magnitude of said basic electric impulse, a synchronous-type electric motor operated by the output of said basic frequency amplifier to move a recording tape past a fixed point whereby said recording tape is moved at a rate proportional to said basic frequency, and a second amplifier tuned to the superimposed frequency and operating a responder to mark said tape at a time corresponding to the timed position of said superimposed frequency with relation to said basic frequency.

9. Student-training apparatus comprising a motion picture film having recorded thereon a consecutive series of pictures exposed from a moving aircraft and including therein a target object, said film having positioned thereon and running adjacent to said pictures a recorded varying low frequency proportional to the closure rate of said aircraft with respect to said target object and having superimposed thereon a frequency of a different range, a pickup unit to transform said frequencies into a periodic electric impulse, a preamplifier to increase the magnitude of said electric impulse, a low-frequency amplifier to further increase the magnitude of said low-frequency electric impulse, a synchronous-type electric motor operated by the output of said low-frequency amplifier to move a recording tape past a fixed point whereby said recording tape is moved at a rate proportional to said low frequency, and a second amplifier tuned to the superimposed frequency and operating a responder to mark said tape at a time corresponding to the timed position of said superimposed frequency with relation to said low frequency.

10. A student-training apparatus, comprising means for projecting a motion-picture film of an aircraft moving toward a target at a variable velocity, means on said motion-picture film and adjacent the pictures thereon for producing a continuous frequency-varying signal of which the frequency values correspond to the rate of closure of the aircraft and the target and for producing intermittent fixed-frequency signal of which the frequency value corresponds to the occurrence of a closure of a desired magnitude, motive means responsive to said frequency-varying signal for moving a recorder at a speed corresponding to said closure rate, means responsive to said fixed-frequency signal for marking said recorder to indicate the occurrence of a desired closure magnitude, and means operable by a student for making a mark in comparative relation to said first mark.

WILLIAM C. HODGSON.

REFERENCES CITED

The following references are of record in the file of this patent:

UNITED STATES PATENTS

| Number | Name | Date |
| --- | --- | --- |
| 161,739 | Bell | Apr. 6, 1875 |
| 1,446,510 | Leventhal | Feb. 27, 1923 |
| 1,712,113 | Khalil | May 7, 1929 |
| 1,950,011 | Scheibell | Mar. 6, 1934 |
| 1,968,836 | Karnes | Aug. 7, 1934 |
| 2,039,405 | Green et al. | May 5, 1936 |
| 2,077,390 | Blaw | Apr. 20, 1937 |
| 2,116,314 | Jenkins et al. | May 3, 1938 |
| 2,213,108 | Pollard | Aug. 27, 1940 |
| 2,230,149 | Weddington | Jan. 28, 1941 |
| 2,295,000 | Morse | Sept. 8, 1942 |
| 2,373,313 | Jeandron | Apr. 10, 1945 |
| 2,392,142 | Gosswiller | Jan. 1, 1946 |
| 2,406,574 | Waller | Aug. 27, 1946 |
| 2,411,147 | Cooley | Nov. 19, 1946 |
| 2,425,003 | Potter | Aug. 5, 1947 |
| 2,431,257 | Kellogg | Nov. 18, 1947 |